(12) United States Patent
Pang et al.

(10) Patent No.: US 11,802,092 B2
(45) Date of Patent: Oct. 31, 2023

(54) CONCRETE CURING AGENT, CURING COATING LAYER AND PREPARATION METHOD THEREOF

(71) Applicants: QINGDAO UNIVERSITY OF TECHNOLOGY, Qingdao (CN); Qingdao Institute of Marine Geology, Qingdao (CN)

(72) Inventors: Bo Pang, Qingdao (CN); Zuquan Jin, Qingdao (CN); Yunsheng Zhang, Qingdao (CN); Yong Yu, Qingdao (CN); Xiaoying Zhang, Qingdao (CN); Chuansheng Xiong, Qingdao (CN); Ning Li, Qingdao (CN); Xiaoyun Song, Qingdao (CN); Mengyuan Li, Qingdao (CN)

(73) Assignees: QINGDAO UNIVERSITY OF TECHNOLOGY, Qingdao (CN); Qingdao Institute of Marine Geology, Qingdao (CN)

( * ) Notice: Subject to any disclaimer, the term of this patent is extended or adjusted under 35 U.S.C. 154(b) by 0 days.

(21) Appl. No.: 18/069,915

(22) Filed: Dec. 21, 2022

(65) Prior Publication Data
US 2023/0202937 A1    Jun. 29, 2023

(30) Foreign Application Priority Data
Dec. 28, 2021 (CN) .......................... 202111629766.2

(51) Int. Cl.
*C04B 41/70* (2006.01)
*C04B 41/00* (2006.01)
(Continued)

(52) U.S. Cl.
CPC ...... *C04B 41/5011* (2013.01); *C04B 41/4961* (2013.01)

(58) Field of Classification Search
CPC ............ C04B 41/4543; C04B 41/5011; C04B 41/4961
See application file for complete search history.

(56) References Cited

U.S. PATENT DOCUMENTS

2001/0032568 A1    10/2001    Schutt
2022/0041518 A1*   2/2022     Zhan ....................... C04B 14/04

FOREIGN PATENT DOCUMENTS

AU    2008324707 A1    5/2009
CN    101723613 A     6/2010
(Continued)

OTHER PUBLICATIONS

Wang et al. "CN 202011595113 machine translation" published Apr. 20, 2021 (Year: 2021).*

(Continued)

*Primary Examiner* — Alex B Efta

(57) ABSTRACT

A concrete curing agent, a curing coating layer and a preparation method thereof, the concrete curing agent comprises a hardening agent and a hydrophobic agent, the raw materials of the hardening agent comprises the following raw materials in parts by weight: 0.1-10 parts of fluorosilicate salt and 100 parts of water, and the hydrophobic agent comprises the following raw materials in parts by weight: 0.1-10 parts of a base catalyst, 1-10 parts of a silane coupling agent, 0.1-10 parts of hydrogen-containing silicone oil, 5-10 parts of a cross-linking agent, 10-100 parts of silica sol and 100-1000 parts of water. The present invention can significantly improve the strength, hardness and hydrophobicity, impermeability and freeze-thaw resistance of surface of concrete before and after hardening, and effectively improves the service life of concrete structures.

6 Claims, 4 Drawing Sheets

(51) Int. Cl.
  *C04B 41/52*   (2006.01)
  *C04B 41/50*   (2006.01)
  *C04B 41/49*   (2006.01)

(56) References Cited

FOREIGN PATENT DOCUMENTS

| CN | 101910085 | A |   | 12/2010 |
| CN | 103449842 | A |   | 12/2013 |
| CN | 103664030 | A |   | 3/2014 |
| CN | 103964737 | A |   | 8/2014 |
| CN | 105417990 | A |   | 3/2016 |
| CN | 107573099 | A |   | 1/2018 |
| CN | 107954624 | A |   | 4/2018 |
| CN | 109485299 | A |   | 3/2019 |
| CN | 111501850 | A |   | 8/2020 |
| CN | 112209651 | A |   | 1/2021 |
| CN | 12592114 | A |   | 4/2021 |
| CN | 202011595113 | A | * | 4/2021 |
| CN | 113336470 | A |   | 9/2021 |
| CN | 113416092 | A |   | 9/2021 |
| JP | H04175388 | A |   | 6/1992 |
| JP | H06287086 | A |   | 10/1994 |
| JP | H0747516 | A |   | 2/1995 |
| JP | 2002128550 | A |   | 5/2002 |
| JP | 2004238423 | A |   | 8/2004 |
| JP | 2013193885 | A |   | 9/2013 |
| JP | 2019147736 | A |   | 9/2019 |

OTHER PUBLICATIONS

Shi Caijun et al., "Advance in Inorganic Surface Treatment of Concrete", Materials Reports, vol. 31, No. 13, Jul. 10, 2017, pp. 113-119.

Zhang Chao et al., "Review of Cement-based Polymer Waterproofing Materials", Materials Reports, No. 19, Oct. 10, 2011, pp. 131-133.

Li Haichuan et al., "Preparation and Application of Modified Water Glass Curing Compound", chemical building material, No. 2, Mar. 20, 2006, pp. 27-30.

* cited by examiner

# CONCRETE CURING AGENT, CURING COATING LAYER AND PREPARATION METHOD THEREOF

CROSS REFERENCE TO RELATED APPLICATIONS

This application claims foreign priority of Chinese Patent Application No. 202111629766.2, filed on Dec. 28, 2021 in the China National Intellectual Property Administration, the disclosures of all of which are hereby incorporated by reference.

TECHNICAL FIELD

The present invention belongs to the technical field of concrete, and particularly relates to a concrete curing agent, a curing coating layer and a preparation method thereof.

BACKGROUND

The concrete curing agent, also called concrete protective agent or concrete curing liquid, is a new polymer preparation prepared by modern high-tech. The curing agent is a liquid film-forming compound with very wide adaptability. Spraying the curing agent on the surface of concrete or mortar, when the water evaporates to a certain extent, it can quickly form a colorless and impermeable film, which can prevent the evaporation of water in the concrete or mortar and reduce the shrinkage and cracking of concrete.

Coating surface protection technology is an important measure that can effectively slow down the corrosion of concrete from the marine environment to improve the durability and service life of concrete structures used in marine salt industry. Conventional coatings generally delay the corrosion of harmful media by forming a dense protective layer on the substrate surface, which relies on the film-forming properties of the coating itself, with the disadvantage that, on the one hand, the protective layer is impermeable to air and easy to be aged, resulting in diseases such as bulging off and fracture/cracking of the protective layer, once the protective layer has a gap, water and moisture will quickly penetrate, resulting in failure; on the other hand, conventional protective coatings can seriously affect the appearance of buildings after aging yellowing. Thus, the reliability and durability of conventional film-forming coatings are very limited.

At present, the existing curing agent or concrete hydrophobization protection technology has not solved the following problems according to the characteristics of surface of concrete for marine salt industry:

(1) The existing surface of concrete cracks loose, and the water-cement ratio of ready-mixed surface of concrete is locally large, resulting in low hardness and insufficient strength, even after grinding and roughening treatment, the surface sometimes still forms a weak interface layer with low strength, resulting in insufficient durability of the structure after curing and hydrophobic treatment.

(2) In the early hydration process of concrete, the excessive crystallization of calcium hydroxide (CH) crystals is caused by the high water-cement ratio in the surface layer, the CH crystals have strong solubility and low hardness, which is disadvantageous to the early shrinkage and cracking resistance. Once a large number of CH crystals are formed on the surface of concrete, it is not conducive to the maintenance of concrete. There is a need to try to convert the CH crystals into a stable state or form that is beneficial to the strength of the surface of concrete.

(3) Conventional fluorosilicate salt type hardening agents have not taken into consideration the environmental hazards caused by the dissolution of the fluorosilicate and need to be converted into an insoluble state or undissolved state to improve the environmental friendliness of the curing agent.

(4) At present, the conventional concrete immersion type waterproofing treatment agents are solvent type and emulsion type. The solvent type has the disadvantages of non-water dilution, invisible water, inflammability and toxicity; with regard to emulsion type, there are weakness such as slow film formation, low wettability, poor hydrophobic effect and insufficient bonding performance with matrix.

In addition to the above factors, the repair economic cost, operability and construction efficiency and the like should be considered comprehensively.

Accordingly, there is a need to provide an improved solution to the above-mentioned deficiencies of the prior art.

SUMMARY

It is an object of the present invention to provide a concrete curing agent, a curing coating layer and a preparation method thereof, so as to solve the problems of low hardness, insufficient strength and easy cracking caused by locally large water-cement ratio of ready-mixed surface of concrete at present, meanwhile, it significantly improve the durability properties of the concrete before and after hardening, such as hydrophobicity, impermeability and resistance to dry-wet-freeze-thaw cycle damage.

In order to achieve the above object, the present invention provides the following technical solutions:

A concrete curing agent comprising a hardening agent and a hydrophobic agent, the concrete curing agent is used by first coating the hardening agent on surface of concrete and then coating the hydrophobic agent, and the raw materials of the hardening agent comprises the following raw materials in parts by weight: 0.1-10 parts of fluorosilicate salt and 100 parts of water, and the hydrophobic agent comprises the following raw materials in parts by weight: 0.1-10 parts of a base catalyst, 1-10 parts of a silane coupling agent, 0.1-10 parts of hydrogen-containing silicone oil, 5-10 parts of a cross-linking agent, 10-100 parts of silica sol and 100-1000 parts of water, wherein the base catalyst is a material that contains or dissolves in water to liberate one of or a mixture of more than one of potassium hydroxide, rubidium hydroxide, cesium hydroxide, calcium hydroxide and barium hydroxide.

The present invention also provides a preparation method of concrete curing coating layer using a concrete curing agent as described above, comprising the following steps:

Step 1, weighing the fluorosilicate salt and water according to the ratio, stirring and mixing uniformly to obtain a hardening agent;

Step 2, weighing an base catalyst and water according to the ratio, stirring and mixing uniformly to obtain a catalytic liquid, and weighing a silane coupling agent, a hydrogen-containing silicone oil, a cross-linking agent and a silica sol according to the ratio, stirring and mixing uniformly to obtain a precursor; placing the precursor and the catalytic liquid in a reaction vessel protected by nitrogen gas, stirring and mixing uniformly at a temperature of −20-30° C. to obtain a hydrophobic agent;

Step 3, coating the hardening agent on the surface of concrete, coating the hydrophobic agent on the surface of concrete sprayed with the hardening agent within 1 min after the hardening agent is coated, and a curing coating is obtained after standing at room temperature.

The present invention also provides a concrete curing coating layer prepared by the preparation method of concrete curing coating layer as described above.

Advantageous Effects (1) The concrete curing agent of the present invention not only has a curing effect of improving the water retention and crack resistance of concrete, but also has a curing effect of improving the strength, hardness and hydrophobicity, impermeability and freeze-thaw resistance of surface of concrete, and effectively improves the service life of concrete structures for marine salt industry.

(2) For the problems of low strength of ready-mix surface of concrete and loose and weak of existing surface of concrete caused by bleeding, the soluble fluorosilicate salt in the hardening agent of concrete curing agent reacts with calcium hydroxide (CH) in concrete to form stable insoluble crystals such as $CaF_2$ and $MgF_2$, the hardening, roughening of surface of concrete is realized (based on Wenzel contact angle model, the hydrophobicity of substance surface is positively correlated with roughness) and the soluble $Ca^{2+}$ and $Mg^{2+}$ are fixed. The cross-linking agent and silica sol in the hydrophobic agent can participate in the cement hydration reaction, promote the formation of silicic acid gel and embed into the pores of the surface of concrete to achieve further hardening and densification of the surface of concrete, and increase the density and durability of the concrete.

(3) With regard to the curing agent provided in the present invention, the base catalyst in the hydrophobic agent is not only a reaction catalyst and a stabilizer of a silane coupling agent, a hydrogen-containing silicone oil and a cross-linking agent, but also an accelerator for stimulating the complexation between the hydrophobic agent and the hardening agent so as to increase the fixation of the hydrophobic substance on the surface of concrete in a chemically bonded manner, and the specific analysis is as follows:

①The base catalyst provides a highly alkaline environment in water, and promotes the hydrolysis of the silane coupling agent, hydrogen-containing silicone oil and cross-linking agent, and generates active hydroxyl groups which can chemically bond with the inorganic interface, and improves the bonding activity of hydrophobic molecules with the surface of concrete;

②The metal cations (potassium, rubidium, cesium, calcium, barium) in the base catalyst generate an electrostatic potential with the oxygen lone pair electrons in the above-mentioned active hydroxyl groups generated by hydrolysis, so as to stabilize the activity of hydroxyl groups in the hydrophobic agent;

③When the surface of concrete sprayed with hardening agent is sprayed again with hydrophobic agent, metal cations (potassium, rubidium, cesium, calcium, barium) in the hydrophobic agent will rapidly complex with fluorosilicate salt in the hardening agent to form insoluble fluoride salt and fluorosilicate salt, and at the same time destabilize the active hydroxyl in the hydrophobic agent to stimulate its condensation activity and promote the binding and fixation of hydrophobic substances on the surface of concrete in the form of covalent bond, coordination bond and the like.

(4) The curing agent provided in the present invention adopts an aqueous treatment scheme, such as a solution-emulsion, which complies with green chemistry, and the curing agent is non-volatile and non-flammable; at the same time, the environmental toxicity of common fluorosilicate salts and the shortcomings of slow reaction rate, low film-forming efficiency and poor hydrophobic effect of emulsion hydrophobic treatment solution were solved; a large amount of fluorosilicate salts ware enriched on the surface of concrete treated with hardening agent, which belonged to acidic interface. The sprayed hydrophobic agent belongs to an alkaline solution, and is also an acid-base neutralization reaction and a rapid chemical reaction (secondary to a radical reaction) through the complexation of the soluble fluorosilicate salt in the hardening agent and the cation in the hydrophobic agent. In this process, there is a co-precipitation effect of fluorosilicate salt and organic matter, and a hydrophobic film-forming coating effect, together forming a fixed effect on fluorosilicate. Further chemical reaction of fluorosilicate with cement hydration products will produce environmentally friendly fluorides and silicic acid gels, consistent with environmentally friendly treatment options.

(5) In the concrete curing agent provided in the present invention, the cross-linking agent and the silane coupling agent both have the effects of promoting the hydrophobic substance to form a film and bond with an inorganic interface, and also have the effects of promoting microstructure densification, roughening and improving the permeability of the hydrophobic substance, and the specific analysis is as follows:

①Silane coupling agent and cross-linking agent both belong to low molecular weight and small molecules with low surface tension, which can significantly reduce the surface tension of aqueous solution, and improve permeability and enhance the synergistic range and effect of curing agent.

②Silane coupling agent and cross-linking agent can react with cement hydration products (calcium hydroxide and C—S—H gel) in the process of hydrolytic condensation to transform soluble calcium salt into insoluble hydrated calcium silicate gel, which has pore blocking effect and improves the surface density of cement stone.

③The nucleation of silane coupling agent and cross-linking agent in the hydrophobic agent can form a large number of molecules and nano-particles, and increase the roughness of microstructure after the surface of concrete is enriched, resulting in the improvement of hydrophobic effect (based on Wenzel contact angle model, the hydrophobicity of substance surface is positively correlated with roughness).

(6) The preparation method of concrete curing coating layer using a concrete curing agent provided in the present invention has a mature scheme, a simple process, can effectively improve the durability of existing concrete structures, and is consistent with the national long-term sustainable development strategy.

Figure 1:
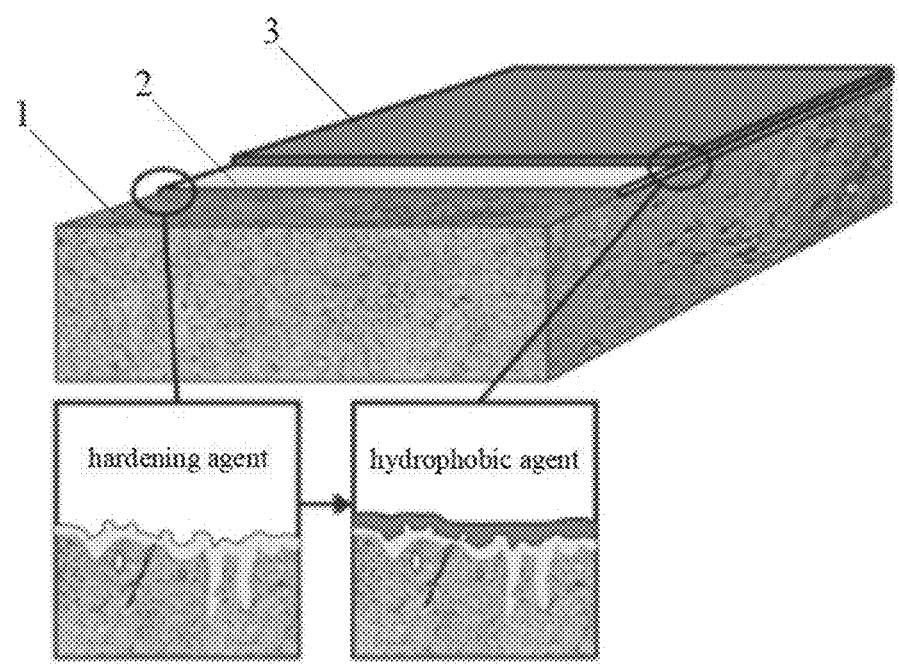
FIG. 1 is a schematic view of a concrete curing coating layer.

In the drawings: 1—concrete; 2—hardening coating layer; 3—hydrophobic coating layer.

DETAILED DESCRIPTION OF THE INVENTION

With regard to the problems of low hardness, insufficient strength and easy cracking caused by locally large water-cement ratio of ready-mixed surface of concrete at present, the present invention provides a concrete curing agent to solve the above problems, meanwhile, it significantly improve the durability properties of the concrete before and after hardening, such as hydrophobicity, impermeability and resistance to dry-wet-freeze-thaw cycle damage. The concrete curing agent of the present invention is applicable to both pre-hardened concrete and post-hardened concrete, and the concrete described below may be either pre-hardened or post-hardened concrete.

The concrete curing agent of the present invention is based on the organic-inorganic co-precipitation effect and the anion-cation complexation effect. The concrete curing agent of the present invention not only has a curing effect of improving the water retention and crack resistance of concrete, but also has a curing effect of improving the strength, hardness and hydrophobicity, impermeability and freeze-thaw resistance of surface of concrete, and effectively improves the service life of concrete structures for marine salt industry. For the problems of low strength of ready-mix surface of concrete and loose and weak of existing surface of concrete caused by bleeding, the soluble fluorosilicate salt in the hardening agent of concrete curing agent reacts with calcium hydroxide (CH) in concrete to form stable insoluble crystals such as $CaF_2$ and $MgF_2$, the hardening, roughening of surface of concrete is realized (based on Wenzel contact angle model, the hydrophobicity of substance surface is positively correlated with roughness) and the soluble $Ca^{2+}$ and $Mg^{2+}$ are fixed; The cross-linking agent and silica sol in the hydrophobic agent can participate in the cement hydration reaction, promote the formation of silicic acid gel and embed into the pores of the surface of concrete to achieve further hardening and densification of the surface of concrete, and increase the density and durability of the concrete.

With regard to the curing agent of the present invention, the soluble fluorosilicate salt in the hardening agent of concrete curing agent reacts with calcium hydroxide (CH) in concrete to form stable insoluble crystals such as $CaF_2$ and $MgF_2$, and the reaction mechanism is as follows:

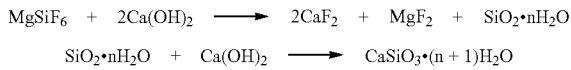

With regard to the curing agent provided in the present invention, the base catalyst in the hydrophobic agent is not only a reaction catalyst and a stabilizer of a silane coupling agent, a hydrogen-containing silicone oil and a cross-linking agent, but also an accelerator for stimulating the complexation between the hydrophobic agent and the hardening agent so as to increase the fixation of the hydrophobic substance on the surface of concrete in a chemically bonded manner, and the specific analysis is as follows:

①The base catalyst provides a highly alkaline environment in water, and promotes the hydrolysis of the silane coupling agent, hydrogen-containing silicone oil and cross-linking agent, and generates active hydroxyl groups which can chemically bond with the inorganic interface, and improves the bonding activity of hydrophobic molecules with the surface of concrete;

②The metal cations (potassium, rubidium, cesium, calcium, barium) in the base catalyst generate an electrostatic potential with the oxygen lone pair electrons in the above-mentioned active hydroxyl groups generated by hydrolysis, so as to stabilize the activity of hydroxyl groups in the hydrophobic agent;

③When the surface of concrete sprayed with hardening agent is sprayed again with hydrophobic agent, metal cations (potassium, rubidium, cesium, calcium, barium) in the hydrophobic agent will rapidly complex with fluorosilicate salt in the hardening agent to form insoluble fluoride salt and fluorosilicate salt, and at the same time destabilize the active hydroxyl in the hydrophobic agent to stimulate its condensation activity and promote the binding and fixation of hydrophobic substances on the surface of concrete in the form of covalent bond, coordination bond and the like.

In the concrete curing agent provided in the present invention, the cross-linking agent and the silane coupling agent both have the effects of promoting the hydrophobic substance to form a film and bond with an inorganic interface, and also have the effects of promoting microstructure densification, roughening and improving the permeability of the hydrophobic substance, and the specific analysis is as follows:

①Silane coupling agent and cross-linking agent both belong to low molecular weight and small molecules with low surface tension, which can significantly reduce the surface tension of aqueous solution, improve permeability and enhance the synergistic range and effect of curing agent.

②Silane coupling agent and cross-linking agent can react with cement hydration products (calcium hydroxide and C—S—H gel) in the process of hydrolytic condensation to transform soluble calcium salt into insoluble hydrated calcium silicate gel, which has pore blocking effect and improves the surface density of cement stone.

③The nucleation of silane coupling agent and cross-linking agent in the hydrophobic agent can form a large number of molecules and nano-particles, and increase the roughness of microstructure after the surface of concrete is enriched, resulting in the improvement of hydrophobic effect (based on Wenzel contact angle model, the hydrophobicity of substance surface is positively correlated with roughness).

Specifically, the cross-linking agent and silica sol in the hydrophobic agent can participate in the cement hydration reaction, the mechanism as follows:

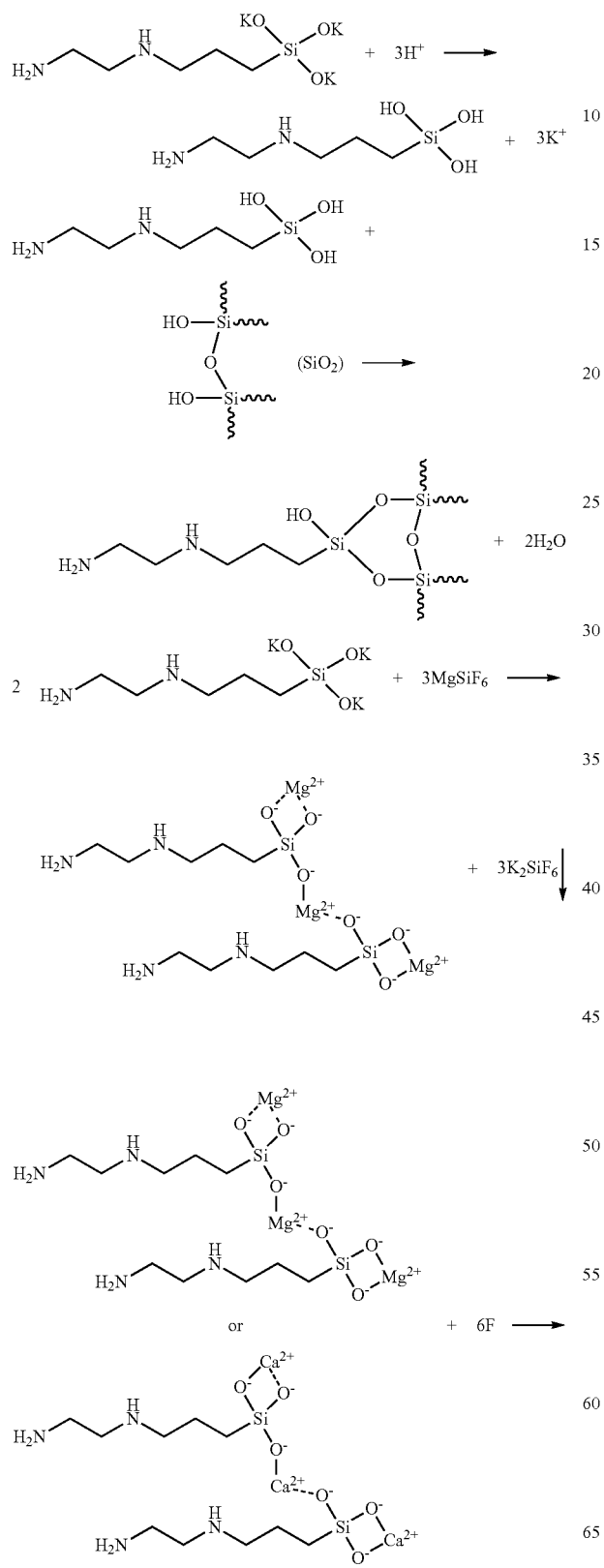

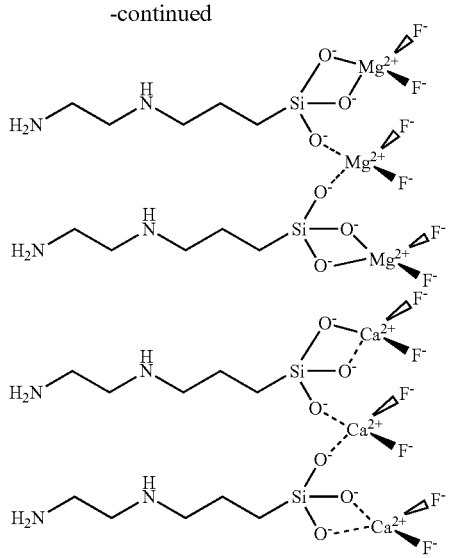

In an example of the present invention, a concrete curing agent of the present invention comprises a hardening agent and a hydrophobic agent, the raw materials of the hardening agent comprises the following raw materials in parts by weight: 0.1-10 parts of fluorosilicate salt and 100 parts of water, and the hydrophobic agent comprises the following raw materials in parts by weight: 0.1-10 parts of a base catalyst, 1-10 parts of a silane coupling agent, 0.1-10 parts of hydrogen-containing silicone oil, 5-10 parts of a cross-linking agent, 10-100 parts of silica sol and 100-1000 parts of water.

The fluorosilicate salt is one of or a mixture of more than one of ammonium fluorosilicate, copper fluorosilicate, iron fluorosilicate, lead fluorosilicate, manganese fluorosilicate, lithium fluorosilicate, sodium fluorosilicate, cobalt fluorosilicate and magnesium fluorosilicate.

The base catalyst is a substance that contains or dissolves in water to liberate one of or a mixture of more than one of potassium hydroxide, rubidium hydroxide, cesium hydroxide, calcium hydroxide and barium hydroxide. Optionally, the base catalyst select and uses one of or a mixture of more than one of potassium hydroxide, rubidium hydroxide, cesium hydroxide, calcium hydroxide and barium hydroxide, or one of or a mixture of more than one of the metals potassium, rubidium, cesium, calcium, and barium.

The silane coupling agent is one of or a mixture of more than one of silane molecules containing vinyl groups, silane molecules containing epoxy groups, and silane molecules containing amino groups.

In particular examples of the present invention, the hydrogen-containing silicone oil is a dimethylpolysiloxane containing Si—H bonds having the general formula (1);

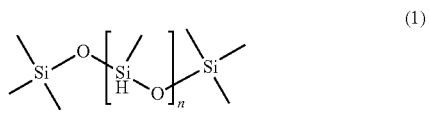

Wherein, n is positive integer, such as n=1, 2, 3 . . . .

The cross-linking agent is one of or a mixture of more than one of tetramethyl silicate, tetraethyl silicate, tetrapropyl silicate, tetrabutyl silicate, tetramethyl titanate, tetraethyl titanate, tetrapropyl titanate, tetrabutyl titanate, triisopropyl aluminate, and tribenzyl aluminate.

The silica sol is one of or a mixture of more than one of acidic silica sol, alkaline silica sol, and neutral silica sol.

In particular examples of the present invention, the weight ratio of hardening agent to hydrophobic agent is (1 to 10):1, for example the weight ratio of the two is 1:1, 3:1, 5:1, 7:1 or 10:1, preferably the weight ratio of hardening agent to hydrophobic agent is 1.2:1.

The present invention also provides a preparation method of concrete curing coating layer using a concrete curing agent as described above, comprising the following steps:

Step 1, weighing the fluorosilicate salt and water according to the ratio, stirring and mixing uniformly to obtain a hardening agent;

Step 2, weighing an base catalyst and water according to the ratio, stirring and mixing uniformly to obtain a catalytic liquid, and weighing a silane coupling agent, a hydrogen-containing silicone oil, a cross-linking agent and a silica sol according to the ratio, stirring and mixing uniformly to obtain a precursor; placing the precursor and the catalytic liquid in a reaction vessel protected by nitrogen gas, stirring and mixing uniformly at a temperature of −20-30° C. to obtain a hydrophobic agent;

Step 3, coating the hardening agent on the surface of concrete, coating the hydrophobic agent on the surface of concrete sprayed with the hardening agent within 1 min after the hardening agent is coated, and a curing coating layer is obtained after standing at room temperature.

It should be noted that stirring and mixing uniformly in step 1 and step 2 means stirring at any stirring rate until the solution is clear and transparent without obvious precipitation. The manner of coating in step 3 may be spraying or brushing.

In particular examples of the present invention, in step 2, the stirring rate of precursor and catalytic liquid is 20-200 rpm and the stirring time is not less than 24 h.

In particular examples of the present invention, in step 3, the amount of hardening agent is at least 200 g per square meter of surface of concrete and the amount of hydrophobic agent is at least 200 g per square meter of surface of concrete. Alternatively, the amount of hardening agent is 500 g per square meter of surface of concrete and the amount of hydrophobic agent is 300 g per square meter of surface of concrete.

The present invention also provides a concrete curing coating layer prepared by the preparation method of concrete curing coating layer as described above. As shown in FIG. 1, the concrete curing coating includes a hardening coating layer 2 formed by coating hardening agent on the surface of concrete 1 and a hydrophobic coating layer 3 formed by coating hydrophobic agent on the surface of concrete 1 sprayed hardening agent.

The concrete curing agent, curing coating layer and preparation method thereof of the present invention are described in detail below by particular examples.

Example 1

The concrete curing agent provided in the this example is composed of a hardening agent and a hydrophobic agent, wherein the raw materials of the hardening agent comprises the following raw materials in parts by weight: 5 parts of fluorosilicate salt (wherein 4 parts of magnesium fluorosilicate and 1 part of ammonium fluorosilicate) and 100 parts of water, and the hydrophobic agent comprises the following raw materials in parts by weight: 5 parts of a base catalyst (wherein 3 parts of potassium hydroxide and 2 parts of calcium hydroxide), 5 parts of a silane coupling agent (wherein 1 part of 2-(3,4-Epoxycyclohexyl)ethyltriethoxysilane and 4 parts of N-β-(Aminoethyl)-γ-aminopropyltrimethoxy silane), 5 parts of hydrogen-containing silicone oil, 5 parts of a cross-linking agent (wherein 4 parts of tetraethyl orthosilicate and 1 part of tetrabutyl titanate), 50 parts of silica sol (wherein 10 parts of alkaline silica sol and 40 parts of neutral silica sol) and 1000 parts of water.

In this example, a preparation method of concrete curing coating layer using a concrete curing agent as described above comprises the following steps:

(1) preparation of hardening agent: weighing the fluorosilicate salt and water according to the ratio, stirring and mixing uniformly to obtain a hardening agent;

(2) preparation of hydrophobic agent: weighing an base catalyst and water according to the ratio, stirring and mixing uniformly to obtain a catalytic liquid; weighing a silane coupling agent, a hydrogen-containing silicone oil, a cross-linking agent and a silica sol according to the ratio, stirring and mixing uniformly to obtain a precursor; placing the precursor and the catalytic liquid in a reaction vessel protected by nitrogen gas, and stirring at a stirring rate of 200 rpm at a temperature of −20° C. for 24 h to form a hydrophobic agent;

(3) preparation of concrete curing coating layer: coating the hardening agent on the surface of concrete by spraying or brushing, coating the hydrophobic agent on the surface of concrete sprayed with the hardening agent in the same manner within 1 min after the hardening agent is coated, and the curing coating layer is obtained after standing at room temperature.

Figure 2:
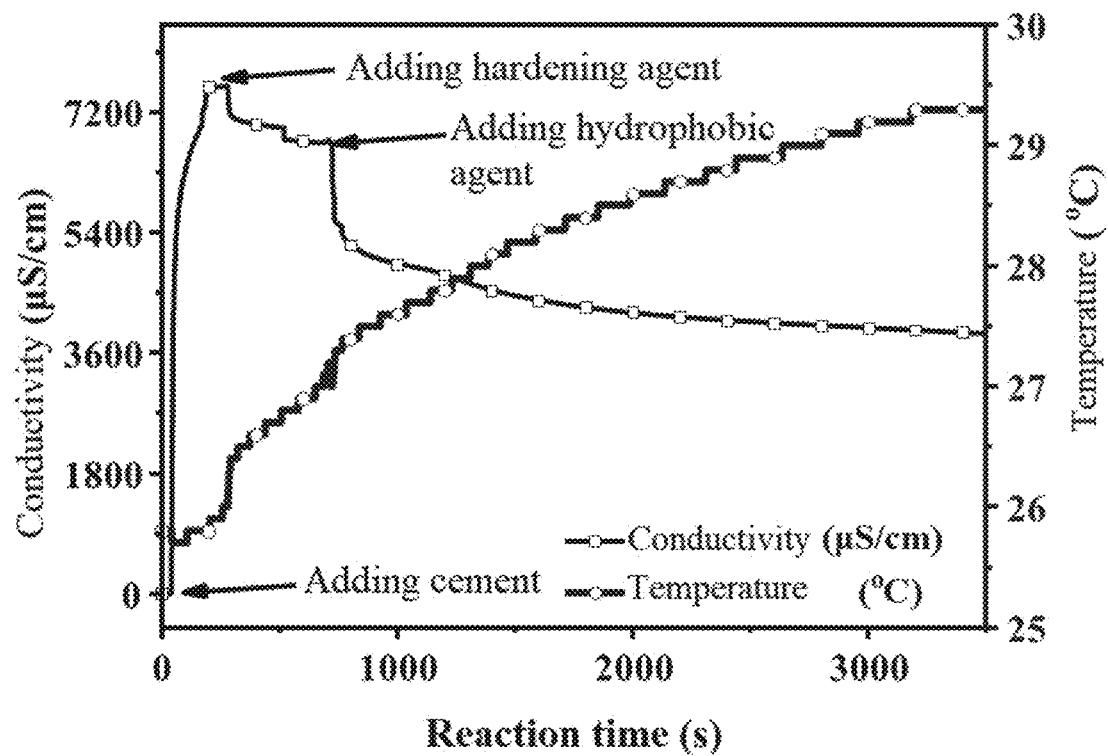
FIG. 2 is an electric conductivity and temperature measurement curves of the reaction efficiency between the concrete curing agent prepared in Example 1 and cement.

FIG. 2 is a electric conductivity and temperature measurement curves of the reaction efficiency between the concrete curing agent prepared in Example 1 and cement. 10 g of cement, 10 mL of hardening agent and 5 mL of hydrophobic agent were respectively mixed in 100 mL of deionized water, and the variation curves of solution conductivity and temperature with stirring time are shown in FIG. 2. It can be seen that with the addition of hardening agent and hydrophobic agent, the solution conductivity decreases to a stable instantaneously, but the temperature of the solution increases continuously, indicating that the curing agent of the present invention reacts with cement at a fast rate and with high efficiency.

Figure 3:
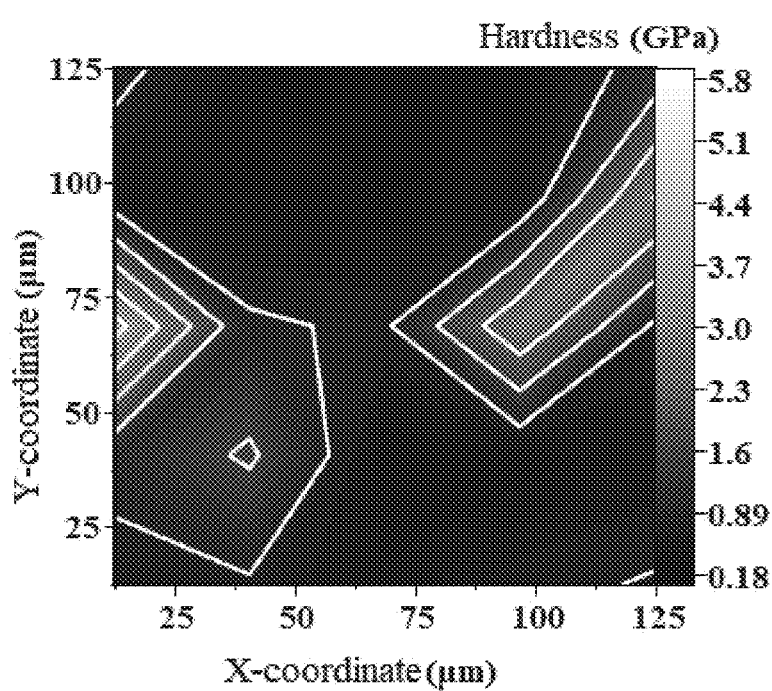
FIG. 3 is a surface microhardness test result of the concrete curing agent prepared in Example 1 before being sprayed on the cement stone.

FIG. 3 is a surface microhardness test result of the concrete curing agent prepared in Example 1 before being sprayed on the cement stone. The results show that the average hardness of the surface of the cement stone sample without sprayed curing agent is 0.975 GPa.

Figure 4:
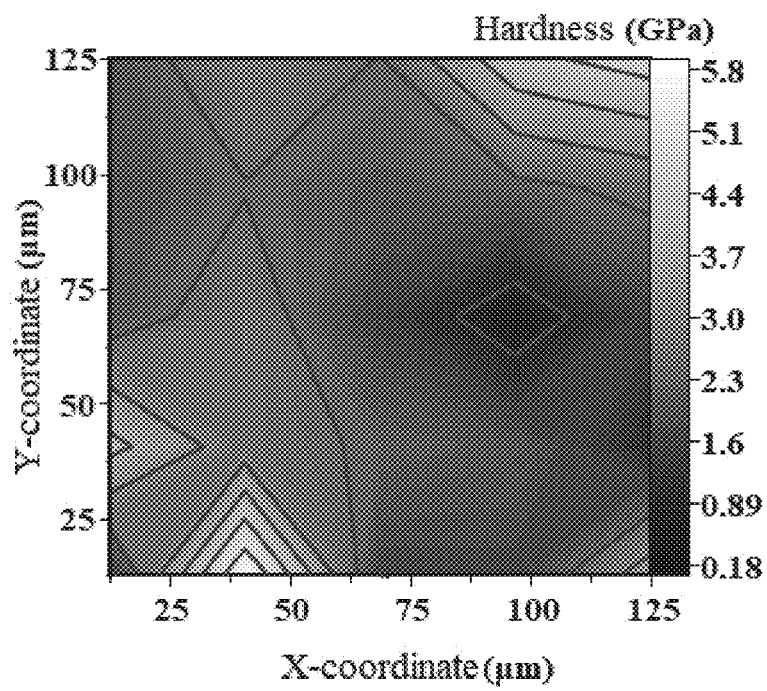
FIG. 4 is a surface microhardness test result of the concrete curing agent prepared in Example 1 being sprayed on the cement stone after 7 days.

FIG. 4 is a surface microhardness test result of the concrete curing agent prepared in Example 1 being sprayed on the cement stone after 7 days. The results show that 7 days after the concrete curing agent of the present invention being sprayed on the surface of the cement stone sample, the average hardness increases from 0.975 GPa to 2.420 GPa, increasing by 148.2%, and the concrete curing agent of the present invention has a hardening effect on the surface of the cement paste.

Figure 5:
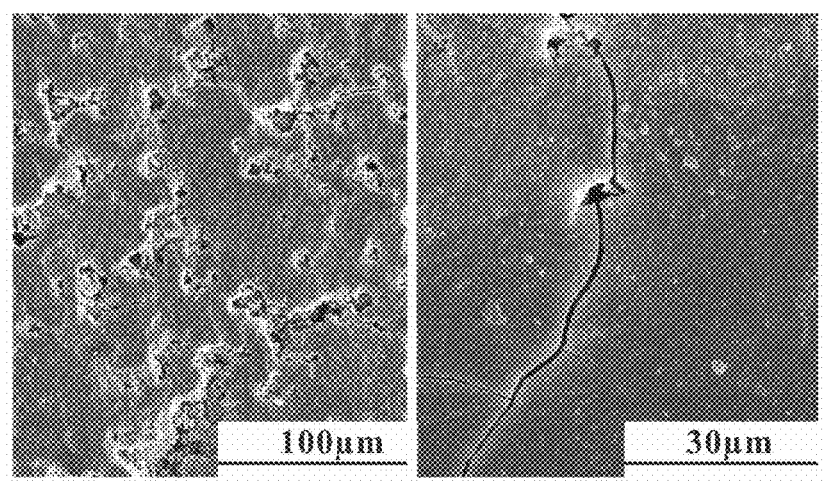
FIG. 5 is a surface microscopic appearance observation result of the concrete curing agent prepared in Example 1 before being sprayed on the cement stone.

FIG. 5 is a surface microscopic appearance observation result of the concrete curing agent prepared in Example 1 before being sprayed on the cement stone. The results show that the surface of the cement stone sample without spraying the concrete curing agent of the present invention has a smooth microstructure without significant coarse particle morphology.

Figure 6:
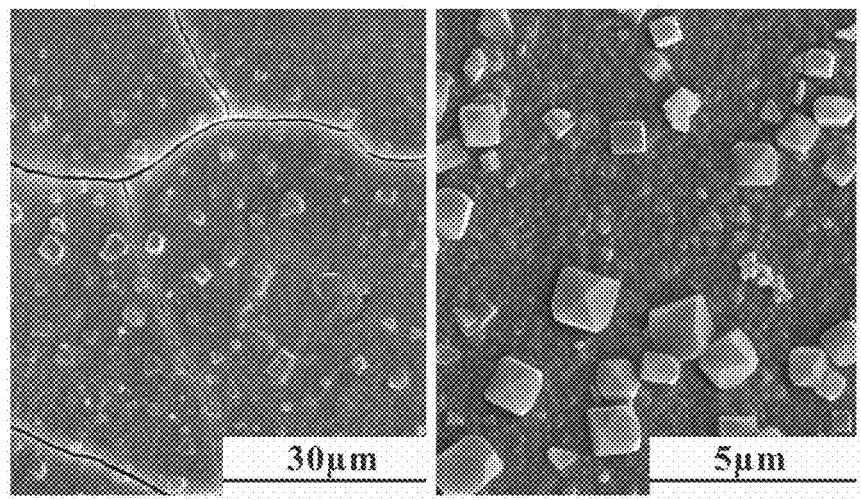
FIG. 6 is a surface microscopic appearance observation result of the concrete curing agent prepared in Example 1 being sprayed on the cement stone after 7 days.

FIG. 6 is a surface microscopic appearance observation result of the concrete curing agent prepared in Example 1 being sprayed on the cement stone after 7 days. The results show that the microstructure of the cement stone sample surface 7 days after spraying the curing agent is a rough morphology with a large number of crystal particles attached, and the concrete curing agent of the present has a roughening effect on the cement stone surface.

Figure 7:
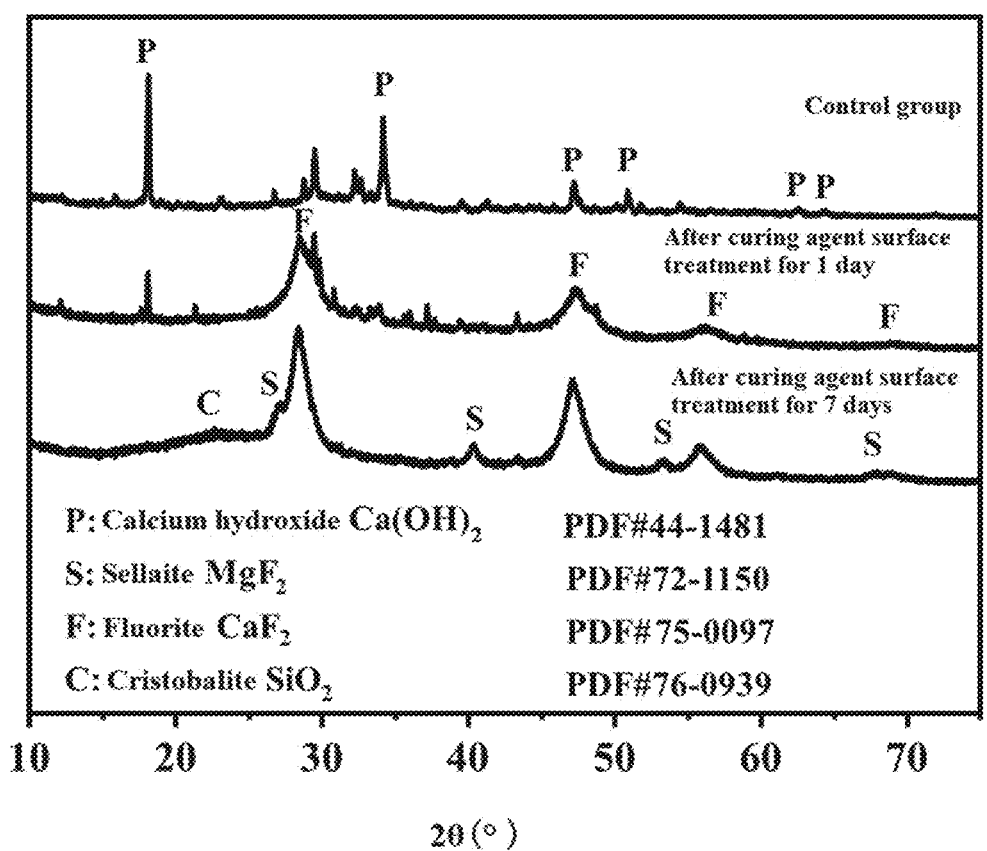
FIG. 7 is a test results of surface X-ray diffraction 1 day and 7 days after the concrete curing agent prepared in Example 1 was sprayed on the cement stone and the surface X-ray diffraction of the cement stone without the concrete curing agent.

FIG. 7 is a test results of surface X-ray diffraction 1 day and 7 days after the concrete curing agent prepared in Example 1 was sprayed on the cement stone and the surface X-ray diffraction of the cement stone without the concrete curing agent. In the figure, the control group is the result of X-ray diffraction test on the surface of cement stone without sprayed concrete curing agent, and PDF #44-1484, PDF #72-1150, PDF #75-0097 and PDF #76-0939 are the corresponding crystal standard diffraction cards (PDF cards), and the crystal data are sourced from the international diffraction data center. The results show that calcium hydroxide is the main crystal component on the surface of the cement stone sample before spraying the concrete curing agent of the present invention. 1 day and 7 days after spraying the concrete curing agent of the present invention, the main crystal components on the surface are fluomagnesite, fluorite and cristobalite, without calcium hydroxide crystal, which indicates that the curing agent consumes calcium hydroxide in the cement and generates more stable and less soluble fluomagnesite, fluorite and cristobalite, which is beneficial to the fixation of soluble calcium salt on the surface of concrete and the improvement of durability.

The test method of the freeze-thaw durability of the concrete prepared in this example was tested according to GB/T 50082-2009 *Standard For Test Methods For Long-term Performance And Durability Of Ordinary Concrete*, the water retention rate of concrete curing agent was tested according to building materials Standard JC901-2002 *Standard For Cement Concrete Curing Cgent*, and the corrosion degree of reinforcing steel in concrete was determined according to DB34/T 1929-2013 *Technical Specification For Corrosion Detection Of Reinforcing Steel In Concrete*. The test method of contact angle of the surface of concrete was tested according to GB/T 30447-2013 *Nano-film Contact Angle Measurement Method*, and the test method of water absorption of concrete was tested according to DB32/T 3696-2019 *Technical Specification For Application Of High Performance Concrete In Jiangsu Province*.

After spraying the concrete curing agent of Example 1 of the present invention for 28 days, the cumulative frequency p of reinforcing bars in the concrete increased from 0.95 to 1.04 (the characteristic K value method, when k=1.0, p≥1, indicates that the reinforcing bars are not corroded); the freeze-thaw resistance index increased from DF=92% to DF=97%; the contact angle of surface of concrete is 152°, the water absorption rate decreased from 2.5% to 0.5%, and the water retention rate of concrete is 89%.

Example 2

In this example, the specific composition of concrete curing agent was changed, and the preparation method of concrete curing coating layer was same to Example 1, and the description thereof will not be repeated. The concrete curing agent provided in the this example is composed of a hardening agent and a hydrophobic agent, wherein the raw materials of the hardening agent comprises the following raw materials in parts by weight: 7 parts of fluorosilicate salt (wherein 3 parts of iron fluorosilicate and 4 parts of copper fluorosilicate) and 100 parts of water, and the hydrophobic agent comprises the following raw materials in parts by weight: 10 parts of a base catalyst (wherein 6 parts of potassium hydroxide, 2 parts of rubidium hydroxide and 2 parts of calcium hydroxide), 6 parts of a silane coupling agent (wherein 4 parts of N,N-Diethyl-3-aminopropyl) trimethoxysilane and 3 parts of 3-aminopropylsilanetriol), 6 parts of hydrogen-containing silicone oil, 7 parts of a cross-linking agent (wherein 4 parts of tetramethyl orthosilicate and 3 parts of titanium n-propoxide), 40 parts of silica sol (wherein 30 parts of neutral silica sol and 10 parts of acid silica sol) and 900 parts of water.

The concrete curing agent prepared in this example was subjected to performance testing according to the performance test standard as in Example 1, the performance structure is as follows:

After spraying the concrete curing agent of this example for 28 days, the cumulative frequency p of reinforcing bars in the concrete increased from 0.98 to 1.17 (the characteristic K value method, when k=1.0, p≥1, indicates that the reinforcing bars are not corroded); the freeze-thaw resistance index increased from DF=95% to DF=98%. The contact angle of surface of concrete is 146°, the water absorption rate decreased from 3.5% to 1.5%, and the water retention rate of concrete is 81%.

Example 3

In this example, the specific composition of concrete curing agent was changed, and the preparation method of concrete curing coating layer was same to Example 1, and the description thereof will not be repeated. The concrete curing agent provided in the this example is composed of a hardening agent and a hydrophobic agent, wherein the raw materials of the hardening agent comprises the following raw materials in parts by weight: 0.1 parts of fluorosilicate salt (wherein 0.1 parts of lead fluosilicate) and 100 parts of water, and the hydrophobic agent comprises the following raw materials in parts by weight: 0.1 parts of a base catalyst (wherein 0.1 parts of rubidium hydroxide), 1 part of a silane coupling agent (wherein 1 part of N,N-Diethyl-3-(trimethoxysilyl)-1-propanamine), 0.1 parts of hydrogen-containing silicone oil, 5 parts of a cross-linking agent (wherein 1 part of tetramethyl orthosilicate and 4 parts of titanium n-propoxide), 10 parts of silica sol (wherein 5 parts of neutral silica sol and 5 parts of acid silica sol) and 100 parts of water.

The concrete curing agent prepared in this example was subjected to performance testing according to the performance test standard as in Example 1, the performance structure is as follows:

After spraying the concrete curing agent of this example for 28 days, the cumulative frequency p of reinforcing bars in the concrete increased from 0.95 to 1.01 (the characteristic K value method, when k=1.0, p≥1, indicates that the reinforcing bars are not corroded); the freeze-thaw resistance index increased from DF=92% to DF=94%. The contact angle of surface of concrete is 133°, the water absorption rate decreased from 3.7% to 2.5%, and the water retention rate of concrete is 77%.

Example 4

In this example, the specific composition of concrete curing agent was changed, and the preparation method of concrete curing coating layer was same to Example 1, and the description thereof will not be repeated. The concrete curing agent provided in the this example is composed of a hardening agent and a hydrophobic agent, wherein the raw materials of the hardening agent comprises the following raw materials in parts by weight: 10 parts of fluorosilicate salt (wherein 3 parts of manganese fluosilicate and 7 parts of lithium fluosilicate) and 100 parts of water, and the hydrophobic agent comprises the following raw materials in parts by weight: 10 parts of a base catalyst (wherein 6 parts of cesium hydroxide, 2 parts of rubidium hydroxide and 2 parts of barium hydroxide), 10 parts of a silane coupling agent (wherein 4 parts of 3-Glycidoxypropyldimethoxymethylsilane and 6 parts of vinyltriacetoxy-silane), 10 parts of hydrogen-containing silicone oil, 10 parts of a cross-linking agent (wherein 7 part of tetrapropyl orthosilicate and 3 parts of titanium methoxide), 50 parts of silica sol (wherein 30 parts of neutral silica sol and 20 parts of alkaline silica sol) and 1000 parts of water.

The concrete curing agent prepared in this example was subjected to performance testing according to the performance test standard as in Example 1, the performance structure is as follows:

After spraying the concrete curing agent of this example for 28 days, the cumulative frequency p of reinforcing bars in the concrete increased from 0.95 to 1.23 (the characteristic K value method, when k=1.0, p≥1, indicates that the reinforcing bars are not corroded); the freeze-thaw resistance index increased from DF=95% to DF=99%. The contact angle of surface of concrete is 152°, the water absorption rate decreased from 3.5% to 0.3%, and the water retention rate of concrete is 94%.

Comparative Example 1

In this comparative example, the specific composition of concrete curing agent was changed, and the preparation method of concrete curing coating layer was same to Example 1, and the description thereof will not be repeated. The concrete curing agent provided in the this comparative example is composed of a hardening agent and a hydrophobic agent, wherein the raw materials of the hardening agent comprises the following raw materials in parts by weight: 10 parts of fluorosilicate salt (wherein 3 parts of manganese fluosilicate and 7 parts of lithium fluosilicate) and 100 parts of water, and the hydrophobic agent comprises the following raw materials in parts by weight: 1 part of a base catalyst (wherein 1 part of sodium hydroxide), 10 parts of a silane coupling agent (wherein 4 parts of 3-Glycidoxypropyldimethoxymethylsilane and 6 parts of vinyltriacetoxy-silane), 10 parts of hydrogen-containing silicone oil, 10 parts of a cross-linking agent (wherein 7 part of tetrapropyl orthosilicate and 3 parts of titanium methoxide), 50 parts of silica sol (wherein 30 parts of neutral silica sol and 20 parts of alkaline silica sol) and 1000 parts of water.

The concrete curing agent prepared in this comparative example was subjected to performance testing according to the performance test standard as in Example 1, the performance structure is as follows:

After spraying the concrete curing agent of this example for 28 days, the cumulative frequency p of reinforcing bars in the concrete increased from 0.95 to 0.96 (the characteristic K value method, when k=1.0, p≥1, indicates that the reinforcing bars are not corroded); the freeze-thaw resistance index remained constant at DF=95%. The contact angle of surface of concrete is 76°, the water absorption rate decreased from 3.5% to 3.4%, and the water retention rate of concrete is 37%.

After analysis, since sodium hydroxide is used in this comparative example, the sodium ions in the sodium hydroxide cannot react with the fluorosilicate, so the protective effect decreases significantly.

Comparative Example 2

In this comparative example, the specific composition of concrete curing agent was changed, and the preparation method of concrete curing coating layer was same to Example 1, and the description thereof will not be repeated. The concrete curing agent provided in the this comparative example is composed of a hardening agent and a hydrophobic agent, wherein the raw materials of the hardening agent comprises the following raw materials in parts by weight: 0.1 parts of fluorosilicate salt (wherein 0.1 parts of lead fluosilicate) and 100 parts of water, and the hydrophobic agent comprises the following raw materials in parts by weight: 0.1 parts of a base catalyst (wherein 0.1 parts of rubidium hydroxide), 1 part of a silane coupling agent (wherein 1 part of N,N-Diethyl-3-(trimethoxysilyl)-1-propanamine), 0.1 parts of hydrogen-containing silicone oil, 5 parts of a cross-linking agent (wherein 1 part of tetramethyl orthosilicate and 4 parts of titanium n-propoxide), 10 parts of silica sol (wherein 5 parts of neutral silica sol and 5 parts of acid silica sol) and 100 parts of water.

The concrete curing agent prepared in this comparative example was subjected to performance testing according to the performance test standard as in Example 1, the performance structure is as follows:

After spraying the concrete curing agent of this example for 28 days, the cumulative frequency p of reinforcing bars in the concrete remained constant at 0.92 (the characteristic K value method, when k=1.0, p≥1, indicates that the reinforcing bars are not corroded); the freeze-thaw resistance index remained constant at DF=92%. The contact angle of surface of concrete is 68°, the water absorption rate decreased from 3.4% to 3.3%, and the water retention rate of concrete is 44%.

After analysis, since lithium hydroxide is used in this comparative example, the lithium ions in the sodium hydroxide cannot react with the fluorosilicate, so the protective effect decreases significantly.

Comparative Example 3

In this comparative example, the specific composition of concrete curing agent was changed, and the preparation method of concrete curing coating layer was same to Example 1, and the description thereof will not be repeated. The concrete curing agent provided in the this comparative example is composed of a hardening agent and a hydrophobic agent, wherein the raw materials of the hardening agent comprises the following raw materials in parts by weight: 7 parts of fluorosilicate salt (wherein 3 parts of iron fluorosilicate and 4 parts of copper fluorosilicate) and 100 parts of water, and the hydrophobic agent comprises the following raw materials in parts by weight: 10 parts of a base catalyst (wherein 6 parts of potassium hydroxide, 2 parts of rubidium hydroxide and 2 parts of calcium hydroxide), 6 parts of a silane coupling agent (wherein 4 parts of N,N-Diethyl-3-aminopropyl)trimethoxysilane and 3 parts of 3-aminopropylsilanetriol), 6 parts of hydrogen-containing silicone oil, 7 parts of a cross-linking agent (wherein 4 parts of tetramethyl orthosilicate and 3 parts of titanium n-propoxide), 40 parts of silica sol (wherein 30 parts of neutral silica sol and 10 parts of acid silica sol) and 900 parts of water.

The concrete curing agent prepared in this comparative example was subjected to performance testing according to the performance test standard as in Example 1, the performance structure is as follows:

After spraying the concrete curing agent of this example for 28 days, the cumulative frequency p of reinforcing bars in the concrete remained constant at 0.94 (the characteristic K value method, when k=1.0, p≥1, indicates that the reinforcing bars are not corroded); the freeze-thaw resistance index remained constant at DF=91%. The contact angle of surface of concrete is 69°, the water absorption rate decreased from 3.9% to 3.8%, and the water retention rate of concrete is 51%.

To sum up, the present invention to provide a concrete curing agent, a curing coating layer and a preparation method thereof, so as to solve the problems of low hardness, insufficient strength and easy cracking caused by locally large water-cement ratio of ready-mixed surface of concrete at present, meanwhile, it significantly improve the durability properties of the concrete before and after hardening, such as hydrophobicity, impermeability and resistance to dry-wet-freeze-thaw damage. In the present invention, a hardening agent is used to react with the soluble calcium salt in the concrete to generate a relatively stable insoluble salt, thereby increasing the hardness and density of the surface layer of the concrete; a hydrophobic agent is sprayed on the surface of the concrete sprayed with the hardening agent, and micro-nano particles and hydrophobic molecules are fixed on the surface of the concrete by chemical bonding through the complex action of fluorosilicate and metal cations in the hydrophobic agent. The present invention can significantly improve the durability of concrete before and after hardening, such as water retention, crack resistance, impermeability and resistance to dry-wet-freeze-thaw cycles. Therefore, the concrete curing agent of the present invention has good economic benefits and long-term social benefits, and has a wide application prospect.

What is claimed is:

1. A concrete curing agent, comprising a hardening agent and a hydrophobic agent; the concrete curing agent is used by first coating the hardening agent on surface of concrete and then coating the hydrophobic agent, and a raw materials of the hardening agent comprises the following raw materials in parts by weight: 0.1-10 parts of fluorosilicate salt and 100 parts of water, and the hydrophobic agent comprises the following raw materials in parts by weight: 0.1-10 parts of a base catalyst, 1-10 parts of a silane coupling agent, 0.1-10 parts of hydrogen-containing silicone oil, 5-10 parts of a cross-linking agent, 10-100 parts of silica sol and 100-1000 parts of water, wherein the base catalyst is a material that contains, or dissolves in water to liberate, one of or a mixture of more than one of potassium hydroxide, rubidium hydroxide, cesium hydroxide, calcium hydroxide and barium hydroxide.

2. The concrete curing agent according to claim 1, wherein the fluorosilicate salt is one of or a mixture of more than one of ammonium fluorosilicate, copper fluorosilicate, iron fluorosilicate, lead fluorosilicate, manganese fluorosilicate, lithium fluorosilicate, sodium fluorosilicate, cobalt fluorosilicate and magnesium fluorosilicate.

3. The concrete curing agent according to claim 1, wherein the silane coupling agent is one of or a mixture of more than one of silane molecules containing vinyl groups, silane molecules containing epoxy groups, and silane molecules containing amino groups.

4. The concrete curing agent according to claim 1, wherein the hydrogen-containing silicone oil is a dimethylpolysiloxane containing Si—H bonds having a general formula (1);

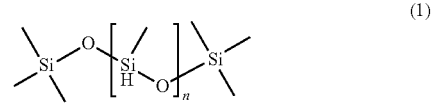

wherein, n is positive integer.

5. The concrete curing agent according to claim 1, wherein the cross-linking agent is one of or a mixture of more than one of tetramethyl silicate, tetraethyl silicate, tetrapropyl silicate, tetrabutyl silicate, tetramethyl titanate, tetraethyl titanate, tetrapropyl titanate, tetrabutyl titanate, triisopropyl aluminate, and tribenzyl aluminate;

the silica sol is one of or a mixture of more than one of acidic silica sol, alkaline silica sol, and neutral silica sol.

6. The concrete curing agent according to claim 1, wherein a weight ratio of the hardening agent to the hydrophobic agent is (1 to 10):1.

* * * * *